US005837959A

United States Patent [19]

Muehlberger et al.

[11] Patent Number: 5,837,959

[45] Date of Patent: *Nov. 17, 1998

[54] SINGLE CATHODE PLASMA GUN WITH POWDER FEED ALONG CENTRAL AXIS OF EXIT BARREL

[75] Inventors: Erich Muehlberger, San Clemente, Calif.; William P. Rusch, Ronkonkoma, N.Y.

[73] Assignee: Sulzer Metco (US) Inc., Westbury, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 536,622

[22] Filed: Sep. 28, 1995

[51] Int. Cl.[6] .................................................. B23K 10/00

[52] U.S. Cl. ................................ 219/121.47; 219/121.5; 219/76.16; 427/446; 427/569

[58] Field of Search ......................... 219/121.47, 121.48, 219/121.5, 75, 76.16; 427/535, 446, 569

[56] References Cited

U.S. PATENT DOCUMENTS

| | | | |
|---|---|---|---|
| 3,280,295 | 10/1966 | Monval et al. | 219/121.47 |
| 3,914,573 | 10/1975 | Muehlberger | 219/76.16 |
| 4,328,257 | 5/1982 | Muehlberger et al. . | |
| 4,877,937 | 10/1989 | Muller | 219/121.47 |
| 5,008,511 | 4/1991 | Ross | 219/76.16 |
| 5,298,835 | 3/1994 | Muehlberger et al. . | |
| 5,408,066 | 4/1995 | Trapani et al. | 219/121.47 |
| 5,420,391 | 5/1995 | Delcea . | |

*Primary Examiner*—Mark H. Paschall
*Attorney, Agent, or Firm*—Loeb & Loeb LLP

[57] ABSTRACT

A single cathode plasma gun injects powder therein so that the powder exits along a central axis of an exit barrel of the gun, in order to provide improved coatings of the powder material on a workpiece. The central axis of the single cathode extends from an arc chamber and intersects with the central axis of the exit barrel so as to form an acute angle which is substantially greater than 0° but no greater than 90°. Examples of the acute angle include 45° and 10°. A powder feed passage extends along an axis which may be coincident with the central axis of the exit barrel or may form an angle with the central axis of the exit barrel of as much as 45°. Consequently, the axis of the powder feed passage forms an angle with the central axis of the single cathode which is at least as great as the acute angle between the central axes of the single cathode and the exit barrel. Existing plasma guns can be retrofitted with a new anode attachment to achieve desired angles of plasma flow and powder delivery. Where the central axis of the single cathode forms an acute angle with the central axis of the exit barrel, the resulting bend in the passage extending from the arc chamber below the single cathode is disposed adjacent an entry end of the exit barrel, and the powder feed passage terminates adjacent such bend. Alternatively, the powder can be introduced into the middle of the plasma stream at the entry end of the exit barrel by a powder injector extending into the exit barrel from the wall of the passage. The single cathode can be axially adjusted to move the charged plasma region adjacent the termination of the powder feed passage, for more effective heating of the powder. The angles formed by the central axes of the single cathode and the powder feed passage relative to the central axis of the exit barrel can be adjusted relative to each other so that the injected powder is deflected along the central axis of the exit barrel, again providing for an improved coating of the powder material on a workpiece.

12 Claims, 6 Drawing Sheets

SINGLE CATHODE PLASMA GUN WITH POWDER FEED ALONG CENTRAL AXIS OF EXIT BARREL

BACKGROUND OF THE INVENTION

1. Field of the Invention

The present invention relates to plasma guns, and more particularly to plasma guns in which powder introduced into the gun is entrained into a plasma stream for deposit on a workpiece spaced from the gun.

2. History of the Prior Art

Plasma guns are known in which powder comprised of metallic or other suitable particles introduced into the gun is entrained into a plasma stream produced by the gun to form a coating on a workpiece spaced from the plasma gun. The plasma stream is created by the introduction of a plasma gas into a region between a cathode and a surrounding anode of the plasma gun, in the presence of a direct current power supply coupled between the cathode and the anode. A separate carrier gas is typically used to direct a stream of powder particles into the plasma stream. A transfer arc may be provided by coupling another direct current power source between the plasma gun and the workpiece.

An example of a plasma gun of this type is provided by U.S. Pat. No. 4,328,257 of Muehlberger et al., which patent issued May 4, 1982 and is commonly assigned with the present application. Plasma guns of this type can be used in different pressure environments including those in which the ambient pressure is at or above atmospheric as well as those in which the ambient pressure is less than atmospheric. The Muehlberger et al. patent describes a plasma system in which vacuum pumps are coupled to a chamber containing the plasma gun to provide a very low pressure therein. As also described in the Muehlberger et al. patent, the polarity of a transfer arc power supply coupled between the plasma gun and the workpiece can be switched, when desired, to provide a reverse transfer arc.

In plasma systems of the type described in the Muehlberger et al. patent, material to be sprayed onto the workpiece as a coating is introduced into the plasma gun in powder form. A powder feed passage located upstream from the exit of the plasma gun introduces the powder into the plasma stream formed within the plasma gun. The powder is entrained into the plasma stream where the particles thereof melt as they are carried by the plasma stream to the workpiece for coating thereon. Typically, the powder feed passage forms an angle such as 90° with the central axis of the plasma gun so that the powder stream is introduced into the plasma stream at a right angle relative thereto.

Plasma systems of the type described have been found to perform well for many applications and to provide a relatively dense and uniform coating of the powder material on the workpiece. For example, a common application of such systems is in the formation of a hard metal coating on aircraft engine parts during refurbishing thereof. Nevertheless, it has been recognized for some time that other arrangements for introducing the powder into the plasma stream may improve the density and uniformity of the coating on the workpiece. For example, axially introduced powder which is injected into the plasma stream from a powder feed passage extending along the central axis of the exit barrel of the gun has been found to provide improved coatings on the workpiece, when compared with those arrangements in which the powder is introduced at a substantial angle such as 90° relative to the central axis of the gun exit barrel. However, in order to have axial powder feed, a different internal gun configuration must be used.

One approach for achieving axial powder feed disposes a plurality of cathodes in symmetrical fashion around the central axis of the plasma gun, with the powder being introduced along the central axis of the gun by a powder feed passage disposed at the center of the plural arrangement of cathodes. An example of such a plasma system is provided by U.S. Pat. No. 5,298,835 of Muehlberger et al., which patent issued Mar. 29, 1994 and is commonly assigned with the present application. Plasma systems of the type described in the Muehlberger et al. '835 patent have been found to provide improved coatings of greater density and uniformity on the workpiece, but at the expense of a more complex plasma gun configuration requiring multiple cathodes.

Accordingly, an on-going goal in the development of plasma gun technology has been a single cathode gun capable of axial powder introduction. In this connection, it has been recognized for some time that powder cannot be introduced from the cathode tip of a single cathode. Early attempts to introduce powder through a central bore in the cathode tip proved unsuccessful. The extreme heat at the cathode tip tends to alloy the metals of the powder and the cathode tip, and otherwise interferes with the electric arc formation. Such conditions also quickly lead to clogging of the powder delivery bore. Therefore, other arrangements must be resorted to if a single cathode approach is to be used.

One such approach is described in U.S. Pat. No. 5,420,391 of Delcea, which patent issued May 30, 1995. The Delcea patent describes a single cathode plasma gun in which axial injection of spray material is made possible by use of a splitter downstream of the arc chamber formed at the tip of the single cathode. The splitter arrangement diverts the plasma stream into a plurality of paths around the outside of a central core containing a tube for the axial introduction of the spray material at a downstream location where the diverted plasma streams rejoin each other. However, while the Delcea patent provides a single cathode plasma gun capable of axial powder injection, such arrangement is not without its problems. In particular, parts of the plasma gun in and adjacent the splitter arrangement tend to burn or are otherwise easily damaged, even when they are made of durable material such as tungsten. This is principally due to the rerouting of the extremely hot plasma stream immediately downstream of the arc chamber so that the axial powder injection can take place.

Accordingly, it would be desirable to provide a single cathode plasma gun capable of introducing powder in a manner which optimizes the characteristics including the density and uniformity of coatings of the powder material formed on a workpiece. At the same time, such plasma guns should be configured so as to minimize or avoid burning or other damage of the internal parts thereof, such as may occur when a splitter arrangement is required to divide and reroute a plasma stream around axial powder introduction apparatus.

BRIEF SUMMARY OF THE INVENTION

Plasma guns in accordance with the invention introduce powder material into the plasma stream in a single cathode configuration so as to significantly improve the quality of coatings of the powder material formed on a workpiece. This is accomplished in the single cathode environment of the invention by introducing the powder so that it flows along the central axis of the exit barrel of the plasma gun after merging with and being entrained into the plasma stream. The single cathode is angled so that the central axis thereof intersects the central axis of the exit barrel at an acute angle which is no greater than and typically substantially less than 90°. Typical angles of the cathode's central axis relative to the exit barrel central axis are 45° and as small as 10°. At the same time, the powder is introduced through a powder feed passage having a central axis which either coincides with the central axis of the exit bore or forms an angle of up to 45° relative thereto. Any angling of the powder feed passage relative to the central axis of the exit barrel is to the opposite side of the central axis of the exit barrel from the central axis of the single cathode. Consequently, the angle formed between the central axis of the powder feed passage and the central axis of the single cathode is always at least as great as the acute angle between the central axis of the cathode and the central axis of the exit barrel.

Introduction of the plasma stream from the single cathode at a relatively small acute angle relative to the central axis of the exit barrel combines with introduction of the powder either along the central axis of the exit barrel or at a relatively small angle relative thereto, so that the powder flow is concentrated along the central axis of the exit barrel. This concentrates the powder at the hotter central portion of the plasma stream, with the result that the quality of coatings of the material of the powder on the workpiece is improved. Also, it has been observed that a plasma stream and a powder stream which are caused to converge upstream of the exit barrel tend to deflect each other to some extent as they meet. This observation is utilized in accordance with the invention to vary the acute angle formed by the central axis of the single cathode and the central axis of the exit barrel relative to the angle formed by the powder feed passage with the central axis of the exit barrel, so as to optimize the manner in which the merging plasma stream and powder stream tend to deflect each other as they merge to form a combined stream. In some applications, the plasma stream produces a greater diverting of the powder stream, than vice versa, so that the angle of the powder feed passage relative to the central axis of the exit barrel may be selected to be larger than the angle formed by the central axis of the single cathode with the central axis of the exit barrel. In still other applications, the plasma stream tends to be diverted more than the powder stream, requiring that the angles be selected accordingly. With proper adjustment, the powder flows along the central axis of the exit barrel after it merges with the plasma stream.

In a first embodiment of a plasma gun according to the invention, the arc chamber at the tip of the single cathode forms a passage which extends along the central axis of the cathode and then through a bend before reaching the entry end of the diverging exit barrel. The central axis of the single cathode forms an acute angle of approximately 45° with the central axis of the exit barrel, at the bend. At the same time, powder is introduced by a powder feed passage which extends along the central axis of the exit barrel so as to enter the passage approximately at the bend.

In an alternative embodiment of a plasma gun according to the invention, the central axis of a single cathode intersects the central axis of the exit barrel, again at a location adjacent the entry end of the exit barrel, so as to form an angle of approximately 10° therewith. At the same time, powder is delivered by a powder feed passage which extends along the central axis of the exit barrel so as to inject the powder into the downstream passage from the arc chamber at a location adjacent the bend therein and the entry end of the exit barrel.

In accordance with a feature of the invention, existing plasma guns may be retrofitted to incorporate the advantages of the invention, without major alteration of the guns or changes in such things as the gun power supply. By replacing the downstream part of the anode with one having an appropriate bend in the downstream passage below the arc chamber and an appropriately angled powder feed that integrates therewith, existing plasma guns are easily adapted to incorporate the features of the invention providing powder feed along the central axis of the exit bore.

In accordance with a further feature of the invention, the single cathode may be axially adjusted to move the charged plasma region into the location of powder introduction. In this way, the powder is introduced into the hotter charged plasma region and more quickly melts and vaporizes so as to improve the coating thereof formed on the workpiece. Axial adjustment can be achieved with spacer rings, by installing a larger cathode in a gun of given configuration, or by providing a motorized axial movement mechanism for the cathode.

In a further alternative embodiment of a plasma gun according to the invention, the arc chamber at the tip of the single cathode forms a passage which extends along the central axis of the cathode and then through a bend before reaching the entry end of the exit barrel. The central axis of the single cathode forms an acute angle of approximately 45° with the central axis of the exit barrel, at the bend. Powder is introduced at a location within and at the central axis of the exit barrel by a powder injector which extends from the wall of the passage in the region of the bend along the central axis of the exit barrel. The powder injector may be water-cooled for high temperature applications, and may be angled relative to the central axis of the barrel, where desired. This embodiment has the advantage of introducing the powder at a location which is at the center of the plasma stream rather than from a side wall. Where the powder injector extends along the central axis of the exit barrel, there is no tendency of the plasma stream to divert the powder stream, or vice versa. The powder simply flows along the central axis of the exit barrel as it exits the plasma gun.

BRIEF DESCRIPTION OF THE DRAWINGS

A better understanding of the invention may be had by reference to the following specification in conjunction with the accompanying drawings, in which.

DETAILED DESCRIPTION

Figure 1:
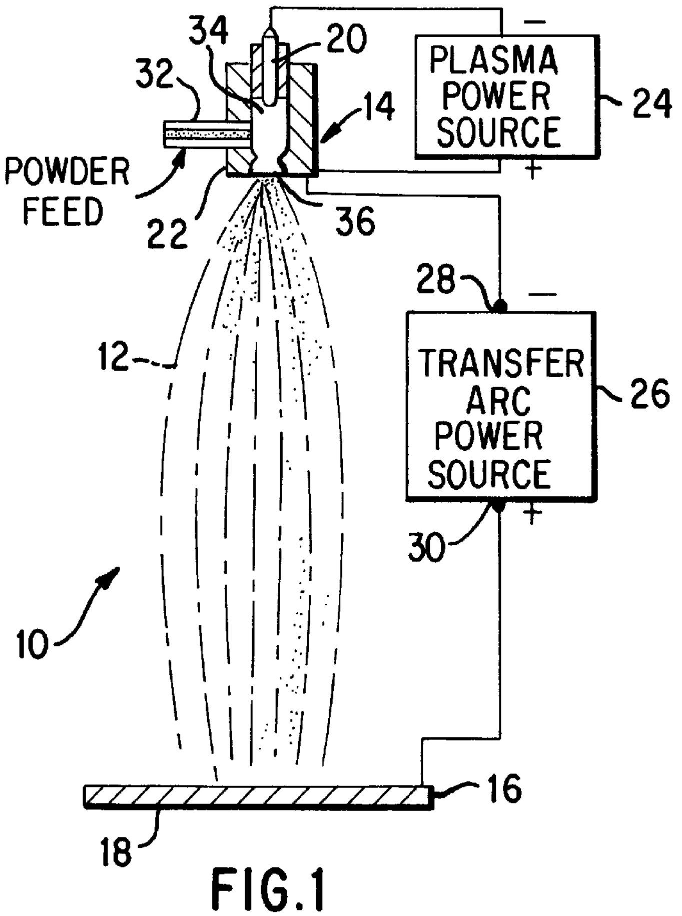
FIG.1 PRIOR ART
FIG. 1 is a simplified schematic view of a prior art plasma system in which powder is injected into the plasma stream at approximately a right angle relative thereto.

FIG. 1 is a simplified schematic view of a prior art plasma system 10 in which powder introduced into a plasma stream 12 produced within a plasma gun 14 is delivered by the plasma stream 12 to a workpiece 16. The powder introduced into the plasma stream 12 within the plasma gun 14 vaporizes and forms a coating of the material thereof on the workpiece 16. The workpiece 16 comprises a substrate 18, in the example of FIG. 1.

The plasma gun 14 includes a cathode 20 surrounded by an anode 22. A direct current plasma power source 24 has the positive terminal thereof coupled to the anode 22 and the negative terminal thereof coupled to the cathode 20. The plasma gun 14 ionizes inert gas fed thereto to form the plasma stream 12 in conventional fashion. In the example of FIG. 1, a transfer arc power source 26 is coupled between the plasma gun 14 and the substrate 18. The transfer arc power source 26 comprises a direct current source, with a negative terminal 28 thereof being coupled to the anode 22 of the plasma gun 14 and a positive terminal 30 thereof being coupled to the substrate 18.

In the prior art example of FIG. 1, powder to be sprayed on the substrate 18 is introduced into the interior of the plasma gun 14 by a hollow powder feed tube 32 extending through the side of the anode 22 and terminating just downstream of an arc chamber 34 within the plasma gun 14. The powder feed tube 32 is positioned at a right angle relative to the central axis of the plasma gun 14 and an included exit barrel 36 at the lower end of the plasma gun 14 through which the plasma stream 12 exits the plasma gun 14. Powder fed into the plasma gun 14 by the powder feed tube 32 is entrained into the plasma stream 12 as the plasma stream 12 exits the plasma gun 14 via the exit barrel 36. The powder vaporizes as it is carried by the plasma stream 12 to the substrate 18 for deposition as a coating on the substrate 18.

As previously noted, the coatings formed on the substrate 18 by the prior art arrangements of the type shown in FIG. 1 may lack the desired density, uniformity or other desired characteristic thereof. This is due in part to the manner in which the powder is introduced into the plasma stream 12 within the plasma gun 14. It is now recognized in accordance with the invention that introduction of the powder at a right angle relative to the central axis of the plasma gun 14 and its exit barrel 36 typically results in at least some if not most of the powder flowing along other than the central axis of the exit barrel 36. Only when most or all of the powder flows along the central axis of the exit barrel 36 does the powder coating formed on the substrate 18 begin to achieve optimum density and uniformity. This is due, at least in part, to the fact that the plasma stream flowing through the exit barrel is much hotter at the central axis of the barrel than at the outer regions of the barrel. The hotter central region of the plasma stream provides greater heating of the powder particles to provide a denser and more uniform coating on the workpiece.

It is known that the density, uniformity and other qualities of the powder coating on the substrate 18 can be improved by axial injection of the powder within the plasma gun 14. As previously described, axial delivery of the powder can be accomplished by a multi-cathode gun configuration in which plural cathodes surround the axial powder delivery apparatus. Alternatively, axial powder delivery can be achieved in a single cathode gun, by using a splitter in the manner of the previously referred to Delsea patent. However, while it requires only a single cathode, the arrangement described in the Delsea patent suffers from disadvantages of its own including the tendency of parts within or adjacent the splitter to burn or otherwise become damaged even though they are made of tungsten or other durable material.

The present invention recognizes the need for the powder to exit the plasma gun along the central axis of the exit barrel, in order for improved coating to take place. This is accomplished by arranging the plasma gun so that the central axis of a single cathode is oriented at an acute angle substantially greater than 0° but no greater than 90° relative to the central axis of the exit barrel. Preferably, the central axis of the single cathode forms a relatively small acute angle of 45° or even substantially less relative to the central axis of the exit barrel. At the same time, powder is fed along an axis which either coincides with the central axis of the exit barrel or which is angled oppositely therefrom by up to 45° relative to the central axis of the single cathode. The angle of powder feed can be selected relative to the angle of the single cathode relative to the central axis of the exit barrel to achieve a desired pattern of powder flow through the exit barrel.

Figure 2:
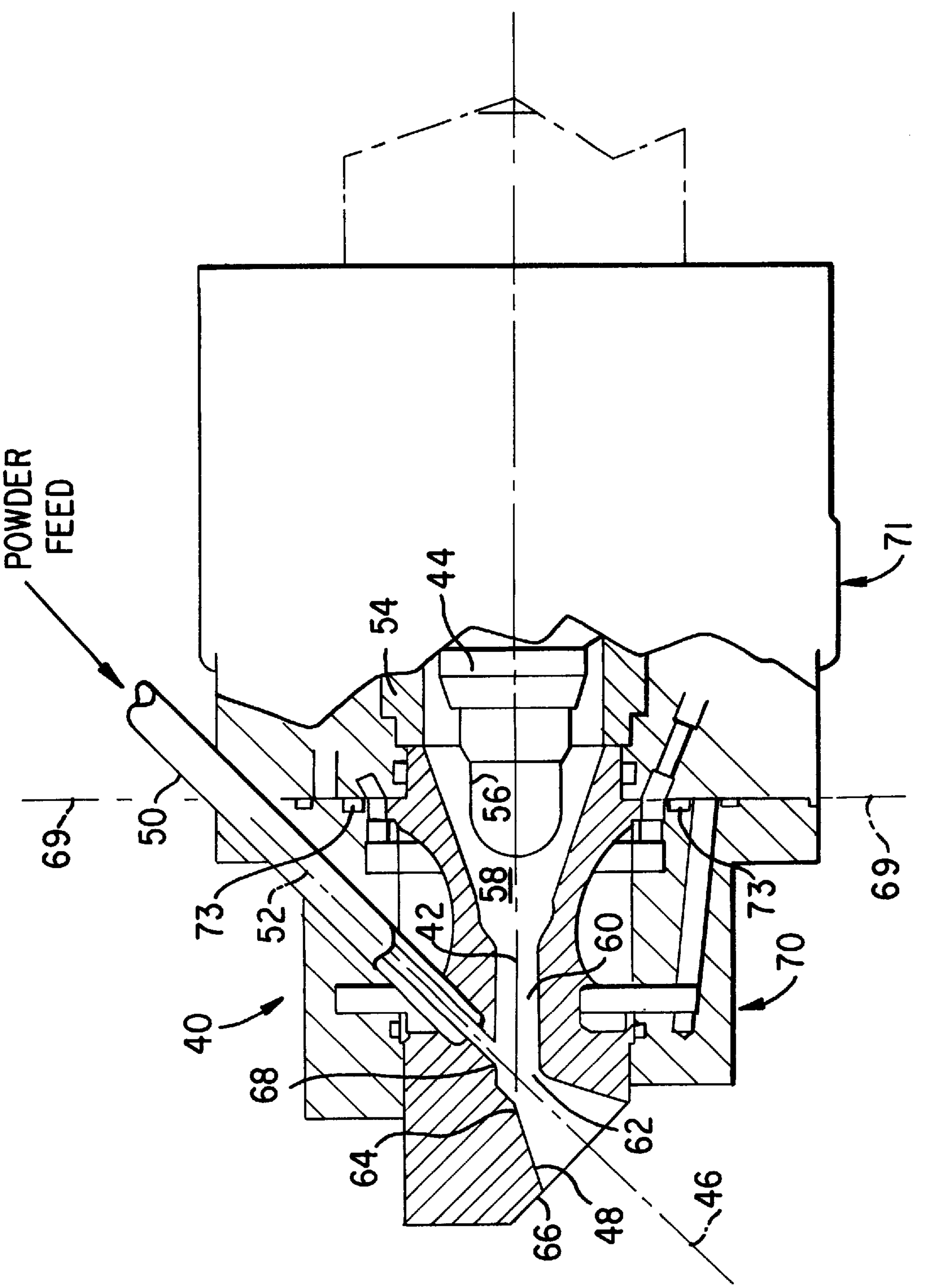
FIG. 2 is a partly broken-away sectional view of a first embodiment of a plasma gun according to the invention.

FIG. 2 shows one arrangement of a plasma gun 40 according to the invention, in which the central axis 42 of a single cathode 44 forms an acute angle of approximately 45° with a central axis 46 of an exit barrel 48. At the same time, a powder feed tube 50 has a central axis 52 thereof which is generally coincident with the central axis 46 of the exit barrel 48.

In the plasma gun 40 of FIG. 2, the single cathode 44 is surrounded by an anode 54. The single cathode 44 terminates in a cathode tip 56 disposed within an arc chamber 58. Plasma forming arc gas is introduced into the arc chamber 58 by a conventional source of arc gas located upstream and which is not shown in FIG. 2. The arc chamber 58 extends into a passage 60 extending along the central axis 42 of the single cathode 44 to a bend 62 in the passage 60. At the bend 62, the passage 60 forms an acute angle of approximately 45° with the central axis 46 of the exit barrel 48. The bend 62 is located adjacent an entry end 64 of the exit barrel 48. The exit barrel 48 diverges from the entry end 64 thereof to an exit end 66 thereof at the outside of the plasma gun 40.

The powder feed tube 50 terminates at an inner end 68 thereof, located adjacent the bend 62 in the passage 60 and the entry end 64 of the exit barrel 48. Powder introduced by the powder feed tube 50 at the inner end 68 thereof is entrained into the plasma stream flowing along the passage 60. Most or all of the introduced powder flows along the central axis 46 of the exit barrel 48 as it exits the plasma gun 40. By introducing the powder so that it flows along the central axis 46 of the exit barrel 48 as it leaves the plasma gun 40, the density, uniformity and other qualities of the coating formed on the workpiece by the powder is significantly improved for a given plasma gun power level.

The portion of the plasma gun 40 to the left of a plane perpendicular to the sheet of the drawing and designated by a dashed line 69 in FIG. 2 comprises an anode attachment 70. The anode attachment 70 is removable from a main gun assembly 71 disposed on the right side of the plane 69 and which includes the anode 54 and the single cathode 44. The anode attachment 70, which is attached to the main gun assembly 71 by bolts 73, includes the downstream portions of the anode which form the arc chamber 58, the passage 60 and the exit barrel 48. The anode attachment 70 also includes the powder feed tube 50 as well as portions of a water cooling system for the plasma gun 40. The main gun assembly 71 is of standard configuration as used with certain prior art plasma guns. Therefore, such prior art plasma guns are easily converted to gun configurations according to the invention simply by replacing the anode attachment thereof with an attachment such as the anode attachment 70 of FIG. 2. To do this, it is only necessary to remove the existing anode attachment and replace it by bolting the new anode attachment in place over the necessary seals on the main gun assembly 71. When retrofitted in this fashion, the plasma gun becomes much more efficient and capable of spraying more effectively, while continuing to use the same power supply and other support systems.

Figure 3:
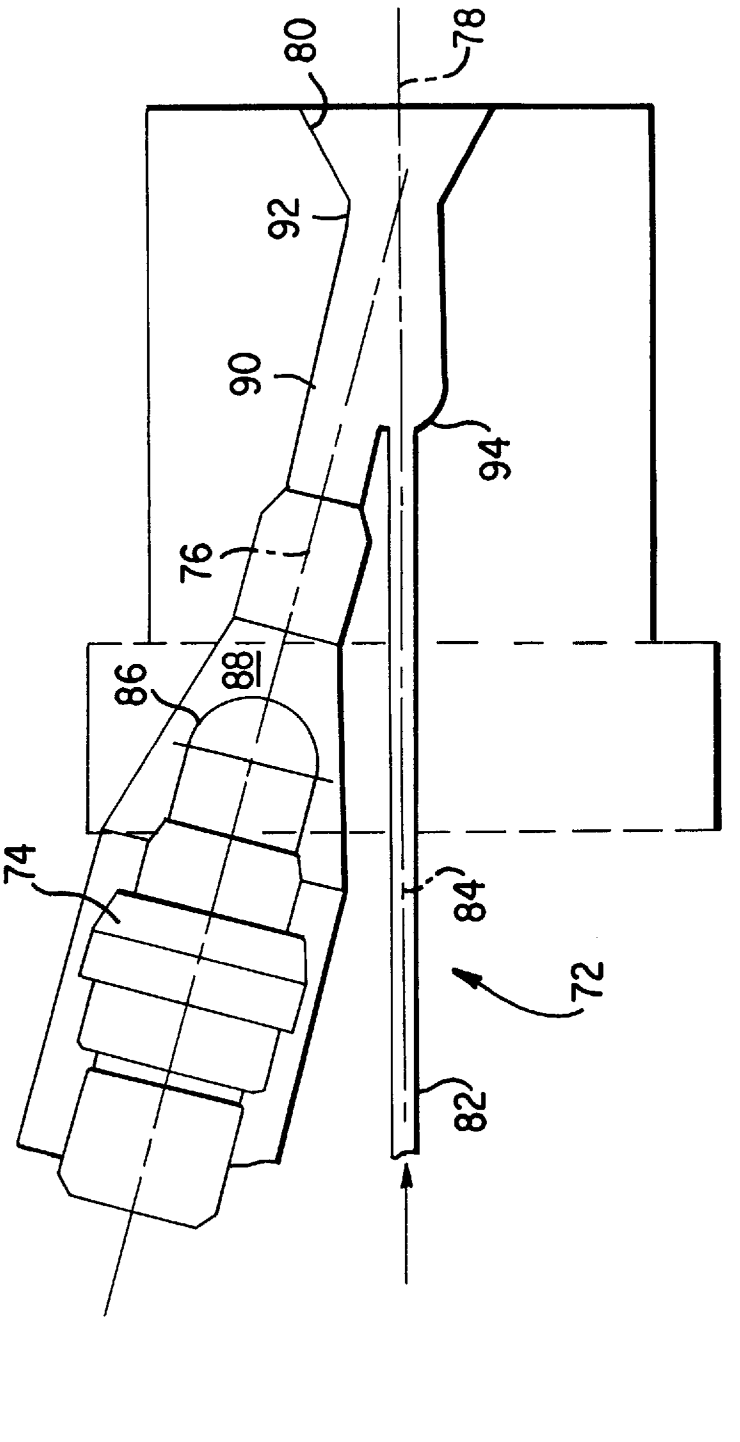
FIG. 3 is a broken-away sectional view of a second embodiment of a plasma gun in accordance with the invention.

An alternative embodiment of a plasma gun 42 according to the invention is shown in FIG. 3. Whereas the plasma gun 40 of FIG. 2 disposes the single cathode 44 thereof so that the central axis 42 thereof forms an acute angle of approximately 45° with the central axis 46 of the exit barrel 48, the plasma gun 72 of FIG. 3 positions a single cathode 74 thereof so that a central axis 76 of the single cathode 74 intersects with and forms an acute angle of approximately 10° with a central axis 78 of an exit barrel 80. At the same time, a powder feed tube 82 is positioned so that a central axis 84 thereof generally coincides with the central axis 78 of the exit barrel 80, in the same manner as in the embodiment of FIG. 2.

In the plasma gun 72 of FIG. 3, the single cathode 74 has a tip 86 thereof disposed adjacent an arc chamber 88. The arc chamber 88 extends into a passage 90 downstream thereof. The passage 90 extends along the central axis 76 of the single cathode 74 to a location approximately at an entry end 92 of the exit barrel 80. At this location, the passage 90 undergoes a 10° bend and joins the entry end 92 of the exit barrel 80. The powder feed tube 82 terminates in an inner end 94 within the passage 90 and somewhat upstream of the entry end 92 of the exit barrel 80.

The single cathode 74 of the plasma gun 72 of FIG. 3 combines with a surrounding anode and the introduction of plasma gas, in the presence of a DC plasma power source, to produce a plasma stream within the arc chamber 88. The plasma stream flows along the passage 90 to the exit barrel 80. At the same time, powder introduced into the powder feed tube 82 is carried by a powder gas flow to the inner end 94, where the powder is entrained into the plasma stream within the passage 90. The entrained powder flows along the central axis 78 of the exit barrel 80 as it passes through the exit barrel 80 and exits the plasma gun 72. Again, the flow of powder along the central axis 78 of the exit barrel 80 within the plasma gun 72 of FIG. 3 has been found to provide greatly improved coatings on the workpiece.

As in the case of the plasma gun 40 of FIG. 2, the configuration of the plasma gun 72 of FIG. 3 can be achieved in the case of an existing plasma gun of prior art configuration by replacing the anode attachment with one having axial powder delivery in the manner of the powder feed tube 82 and plasma stream delivery at an angle of 10° relative to the central axis 78 of the exit barrel 80 in the manner of FIG. 3.

Figure 4:
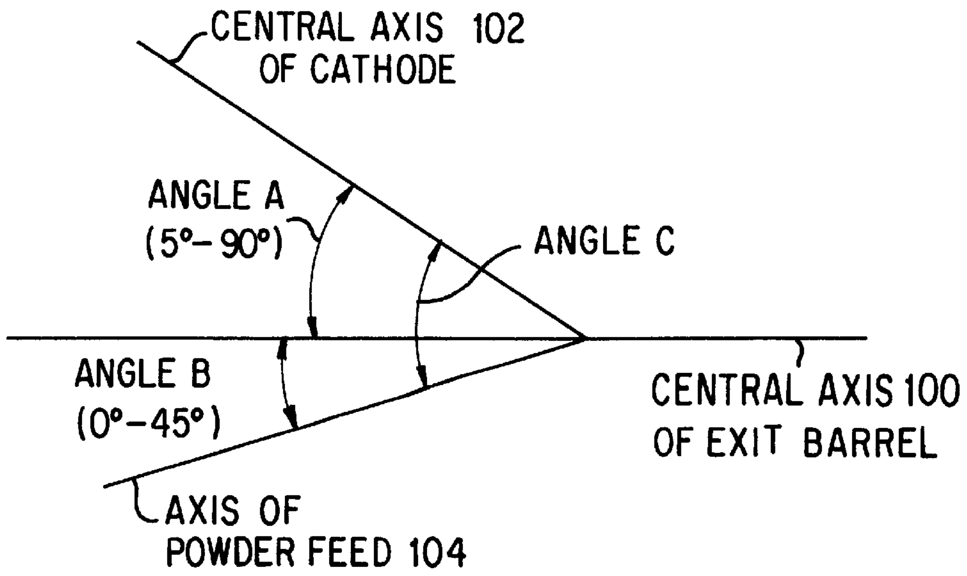
FIG. 4 is a diagrammatic illustration of the manner in which the angles formed between the central axes of the single cathode, the powder feed passage and the exit barrel can be selected in accordance with the invention.

FIG. 4 is a diagrammatic representation of the manner in which the angles of the various components of a plasma gun may be varied to improve the spray coating of the powder or other particulate material on the workpiece. In accordance with the invention, the powder is desirably introduced within the plasma gun so that it flows along the central axis of the exit barrel of the plasma gun. An exit barrel central axis 100 is shown in FIG. 4. A single cathode of the plasma gun has a central axis 102 which intersects the central axis 100 of the exit barrel so as to form an acute angle A therewith. The angle A is substantially greater than 0° so as to preferably be a minimum of at least 5°. At the same time, the angle A is no greater than 90°. Preferably, the angle A is considerably less than 90° and more on the order of the 45° angle of the plasma gun 40 of FIG. 2 or the 10° angle of the plasma gun 72 of FIG. 3. The single cathode is angled from the central axis 100 of the exit barrel by an angle A which is large enough to permit introduction of the powder either axially (along the central axis 100 of the exit barrel) or at a relatively small angle relative to the central axis 100. For this reason, the angle A should be at least 5°. At the same time, an angle A at or close to 90° is relatively severe, inasmuch as the plasma stream introduced at such an angle results in substantial deflection of the introduced powder stream as well as the plasma stream, at the point of merger, making it difficult to achieve a powder stream flow along the central axis 100 as it exits the exit barrel of the plasma gun.

In the illustration of FIG. 4, the powder feed occurs along an axis 104 which forms an angle B with the central axis 100 of the exit barrel. The angle B may be as small as 0°, in which event the axis 104 is generally coincident with the central axis 100 of the exit barrel, as in the case of the examples of FIGS. 2 and 3. However, the angle B can be as great as 45°. The axis 104 of powder feed forms an angle C with the central axis 102 of the single cathode. The powder feed axis 104 must be angled opposite the central axis 100 of the exit barrel from the central axis 102 of the cathode, so that the angle C is always at least as large as the angle A. In the examples of FIGS. 2 and 3, the angle C is equal to the angle A, inasmuch as the angle B is 0°. In instances where the angle B is greater than 0°, then the angle C is larger than the angle A.

In accordance with the invention, the angles A and B may be chosen relative to each other to achieve flow of the powder along the central axis 100 of the exit barrel, thereby optimizing the characteristics of the coating formed on the workpiece by the powder. Taking into consideration the internal characteristics of the plasma gun, including the location of the point of injection of the powder relative to the exit barrel, and given the tendency of the plasma flow and the injected powder stream to deflect each other, for a given angle A, the angle B may be selected to optimize the powder spraying conditions. Conversely, if the plasma gun configuration has already determined an angle B of powder feeding, then the angle A may be chosen relative thereto in order to optimize the powder spraying conditions.

Figure 5:
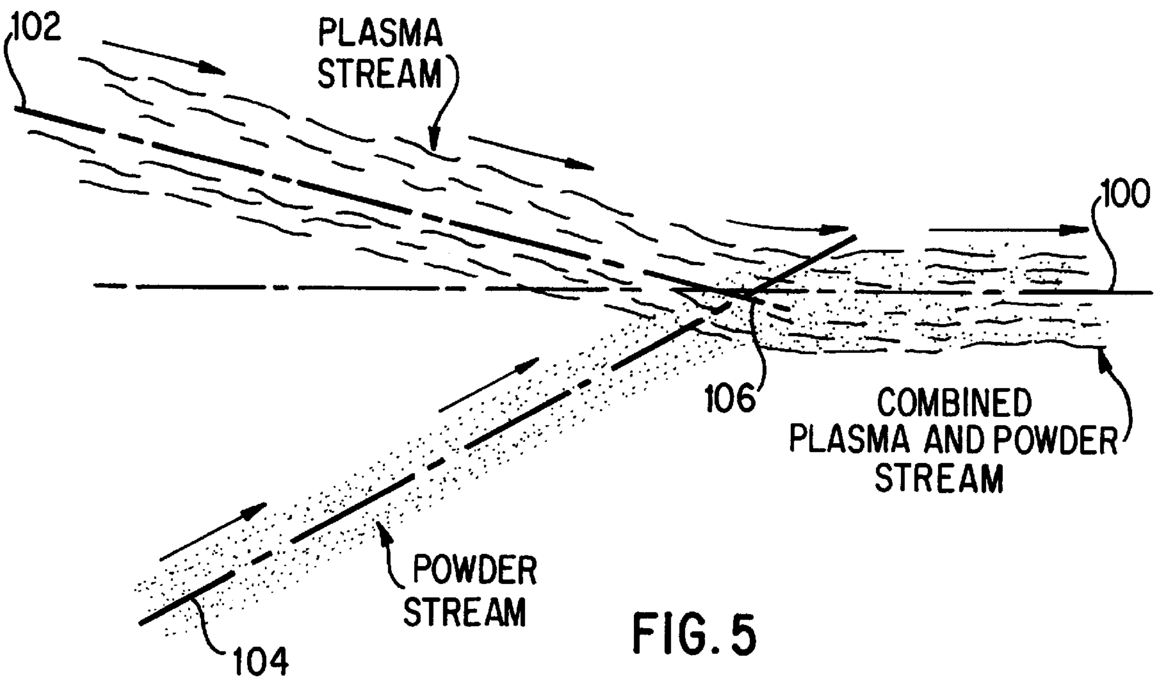
FIG. 5 illustrates a plasma stream as it merges with a powder stream within plasma guns according to the invention.

The manner in which a plasma stream and a powder stream which are angled relative to each other tend to merge, so as to entrain the powder stream into the plasma stream, is illustrated in FIG. 5. In the example of FIG. 5, the plasma stream is assumed to flow along the central axis 102 of a single cathode. The powder stream is assumed to flow along an axis 104, determined by the central axis of a powder feed tube. The plasma stream and the powder stream are both assumed to flow from left to right, as represented by arrows shown in FIG. 5. The axes 102 and 104 intersect at a point 106, where the two streams merge and the powder stream is entrained into the plasma stream. The combined plasma and powder stream is shown to the right of the point 106 in FIG. 5. In many cases, the plasma stream has more energy than the powder stream, so as to be deflected less than the powder stream when the two streams converge. In the example of FIG. 5, the plasma stream is shown undergoing a smaller change in direction than is the powder stream. The combined streams flow along the central axis 100. In some instances, however, the plasma stream undergoes greater deflection than the powder stream, upon merger. In that event the delivery of the plasma stream and the powder stream must be angled differently to achieve a combined flow along the central axis 100.

By configuring the plasma gun so that the central axis 100 becomes the central axis of the exit barrel, most or all of the powder from the powder stream flows along the central axis of the exit barrel as it exits the plasma gun. Again, this has been found in accordance with the invention to optimize the characteristics of the coating formed by the powder as it vaporizes within the plasma stream and is coated on the workpiece.

Plasma guns in accordance with the invention are configured to discharge most or all of the powder from the gun so that it flows along the central axis of the exit barrel. This is based on the observation that powder flowing along the central axis of the exit barrel forms a denser and more uniform coating on the work piece. This is due, at least in part, to the fact that the plasma stream into which the powder stream is entrained tends to be significantly hotter at the center thereof (along the central axis of the exit barrel) than at the outer regions thereof adjacent the walls of the exit barrel. By concentrating the exiting powder along the central axis of the exit barrel, the hotter temperatures produce a faster and more complete melting of the powder as it is carried to the workpiece and deposited thereon. Powder carried by the cooler regions of the plasma stream adjacent the walls of the exit barrel is often inadequately heated, and tends to deflect from the workpiece rather than forming a coating thereon.

In accordance with the invention, the single cathode can be axially adjusted to provide better and more effective heating of the powder at the point of introduction of the powder at the end of the powder feed passage. By doing so, the quality of the coating on the workpiece is improved, even in cases where substantial quantities of the powder may undergo less than the ideal flow along the central axis of the exit barrel. Moreover, by better utilizing the energy of the plasma gun to quickly heat and melt the powder particles, a given workpiece coating with good characteristics can be produced with a smaller power supply. This feature in accordance with the invention may be better understood with reference to FIGS. 6A and 6B.

Figure 6A:
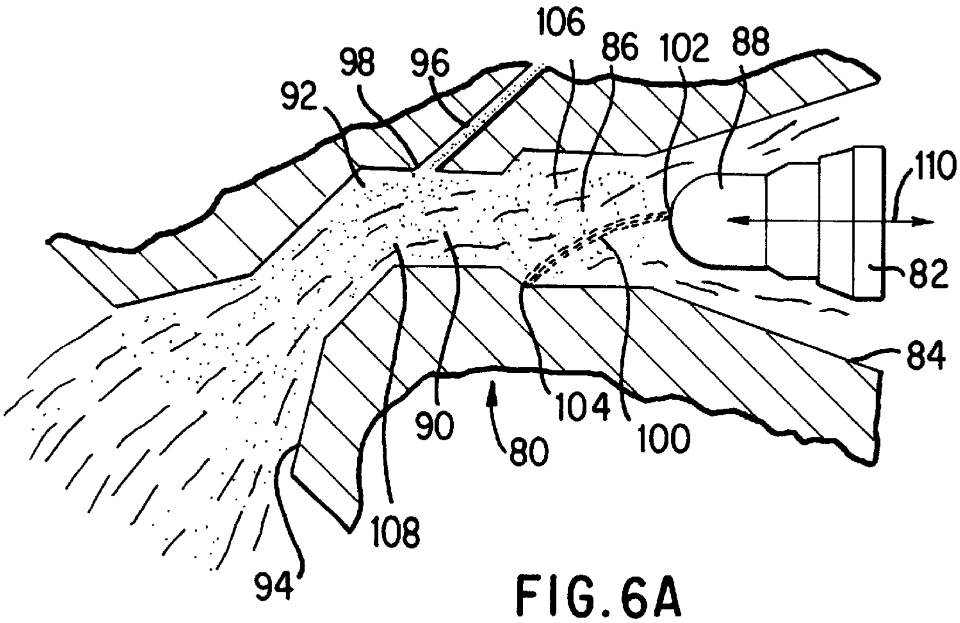
FIGS. 6A and 6B are sectional views of a plasma gun illustrating the manner in which axial adjustment of the single cathode may be used to produce different plasma regions at the point of powder introduction to optimize powder feed and coating conditions.

FIG. 6A is a cross-sectional view of a portion of a plasma gun 80 which includes a single, axially adjustable cathode 82 positioned within a surrounding anode 84. The anode 84 forms an arc chamber 86 in the region of a tip 88 of the single cathode 82. The arc chamber 86 extends into a downstream passage 90 which extends through a bend 92 of approximately 45° before diverging as an exit barrel 94. A powder feed passage 96 terminates at an inner end 98 thereof in the region of the bend 92. The powder feed passage 96 has a central axis thereof generally coincident with a central axis of the exit barrel 94 so as to provide axial powder delivery, in the manner of the plasma gun arrangement of FIG. 2. The arrangement of the plasma gun 80 is also like that of FIG. 2 in terms of the positioning of the single cathode 82 within the anode 84, in the example of FIG. 6A.

As plasma gas flows between the single cathode 82 and the walls of the anode 84, in the presence of a plasma power source coupled between the cathode 82 and the anode 84, a plasma arc 100 is produced. The arc 100 emanates from a cathode arc attachment 102, consisting of a spot at the tip of the cathode tip 88, and strikes the wall of the anode 84 at an anode attachment 104, which is a spot on the anode wall where the arc 100 terminates. While the plasma gas tends to undergo a tangential, swirling motion as it moves through the arc chamber 86, the arc 100 tends to extend to the same anode attachment 104 on the wall of the anode 84. Consequently, the anode attachment 104 becomes very hot, and can burn if proper cautions are not exercised.

The region in which the arc 100 lies is characterized by the presence of a charged plasma 106. Within the charged plasma 106, ions flow to the cathode 82 and electrons flow to the anode 84. Consequently, the charged plasma 106 is characterized by very high temperatures. As the charged plasma 106 flows from the arc chamber 86 into the passage 90 and approaches the bend 92, it becomes a neutral plasma 108. The neutral plasma 108 is characterized by a condition of electrical neutrality, in which the potential difference provided by the plasma power source is satisfied, and few if any ions and electrons continue to flow therein. Consequently, the neutral plasma 108 is considerably cooler than the charged plasma 106. In the example of FIG. 6A, the plasma stream enters a neutral plasma condition before reaching the inner end 98 of the powder feed passage 96, so that the powder is introduced into the cooler neutral plasma 108. Nevertheless, the powder is adequately heated by the neutral plasma 108 so as to form a high quality coating on the workpiece as long as the plasma gun is configured to cause flow of the powder along the central axis of the exit barrel 94.

Figure 6B:
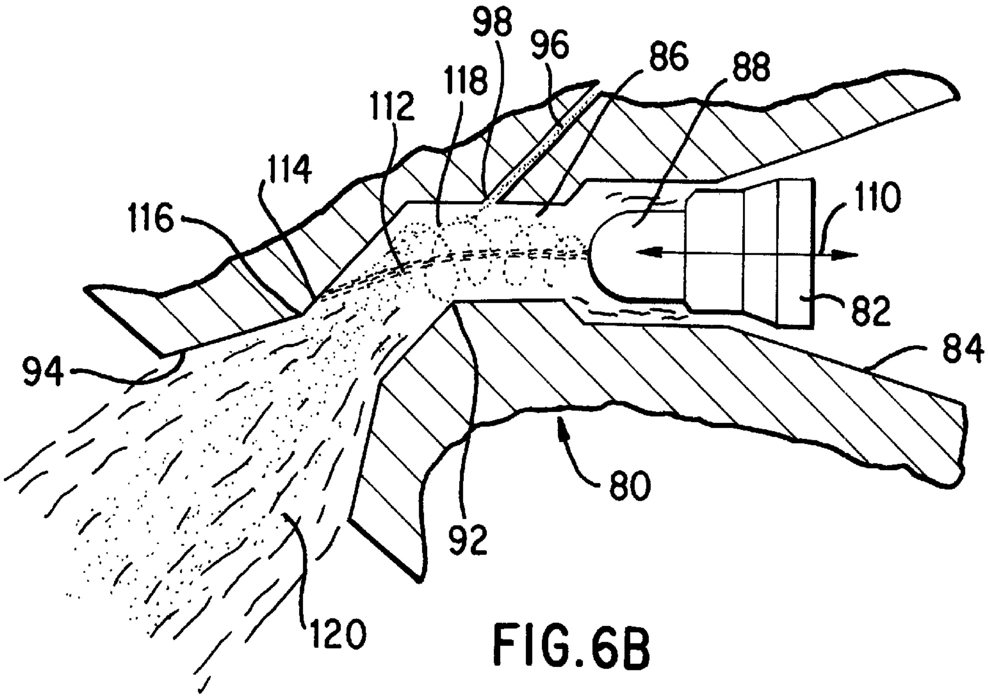

In accordance with the invention, the single cathode 82 may be axially adjusted, as represented by an arrow 110 in FIG. 6A. Like FIG. 6A, FIG. 6B is a cross-sectional illustration of the plasma gun 80. However, in the example of FIG. 6B, the single cathode 82 has been axially moved into the arc chamber 86 and toward the passage 90 and the bend 92. Such axial adjustment or repositioning of the single cathode 82 can be accomplished in one of several ways. One way is to simply replace the cathode 82 of the arrangement of FIG. 6A with a longer cathode. Alternatively, spacer rings can be used to move the single cathode 82 of FIG. 6A into the position shown in FIG. 6B. A still further alternative is to couple the single cathode 82 to a motorized drive, in which event the axial position of the cathode 82 can be adjusted until the powder spraying conditions are optimized.

In any event, the example of FIG. 6B depicts the single cathode 82 as having been moved well forward into the arc chamber 86, compared with the cathode position depicted in FIG. 6A. With the single cathode 82 positioned as shown in FIG. 6B, a new arc 112 is formed. The new arc 112 extends from the cathode arc attachment 102 on the cathode tip 88 to a new anode attachment 114 located well past the bend 92 in the passage 90 and adjacent an entry end 116 of the exit barrel 94. This has the effect of extending the arc chamber so as to create a new charged plasma region 118 which extends almost to the entry end 116 of the exit barrel 94. Consequently, a new neutral plasma region 120 begins in the region of the entry end 116 of the exit barrel 94 and extends out of the exit barrel 94 and to the workpiece spaced from the plasma gun 80.

Because the charged plasma 118 extends well past the inner end 98 of the powder feed passage 96, in the example of FIG. 6B, powder is introduced into the charged plasma 118. When compared with introduction of the powder into the neutral plasma 108 in the example of FIG. 6A, the charged plasma 118 is much more effective in quickly and thoroughly melting the powder as it is entrained into the plasma stream, in the example of FIG. 6B. With the powder quickly melted in this fashion, the neutral plasma 120 contains enough heat to maintain the powder in the molten state so that a superior coating is formed on the workpiece. This is true even when the configuration of the plasma gun does not provide for passage of most or all of the powder along the central axis of the exit barrel 94.

A further advantage provided by the example of FIG. 6B lies in the ability to produce a given workpiece coating with good characteristics using a smaller power supply, in many instances. A major objective in plasma spraying is to heat the powder particles to a temperature at which they melt, as quickly as possible upon introduction into the plasma stream. Thereafter, the energy of the plasma stream maintains the powder particles in a melted state as they are carried to the workpiece to form a coating thereon. It has been found that by introducing the powder into charged plasma, this can be accomplished using less energy than would otherwise be required. Consequently, it is frequently possible to achieve a given workpiece coating with good characteristics, while at the same time using a smaller power supply than would otherwise be required.

Figure 7:
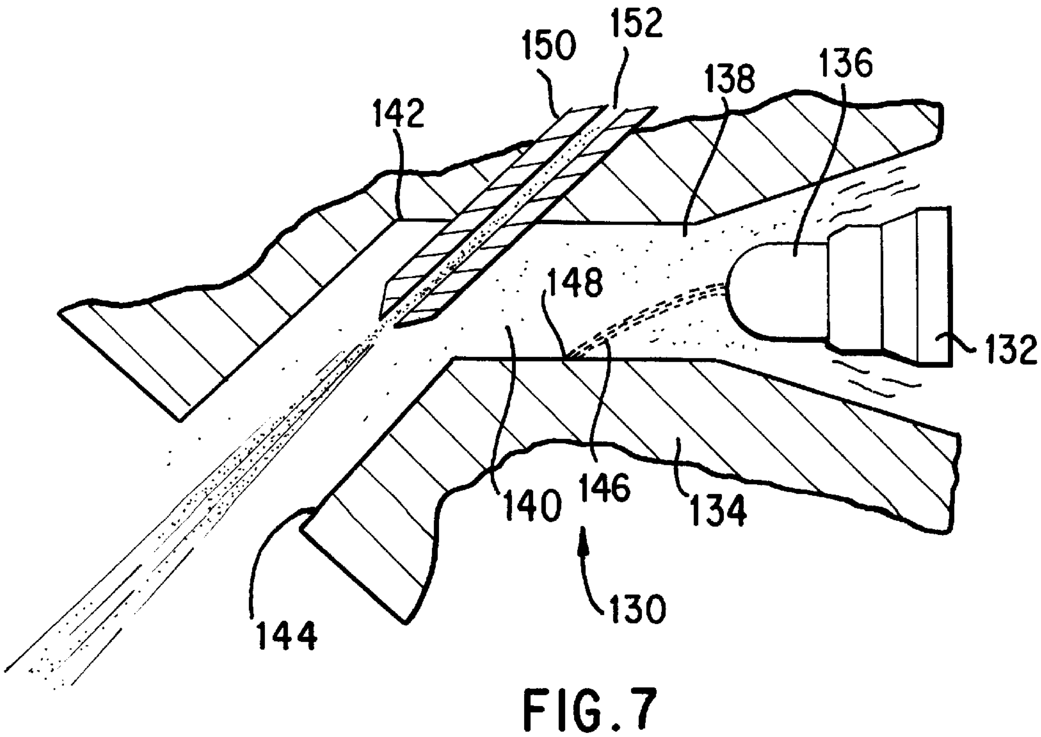
FIG. 7 is a broken-away sectional view of a third embodiment of a plasma gun in accordance with the invention.

A further alternative embodiment of a plasma gun 130 according to the invention is shown in FIG. 7. In the plasma gun 130 of FIG. 7, a single cathode 132 is surrounded by an anode 134. The single cathode 132 terminates in a cathode tip 136 disposed within an arc chamber 138. The arc chamber 138 extends into a passage 140 extending along the central axis of the cathode 132 to a bend 142 in the passage 140. At the bend 142, the passage 140 forms an acute angle of approximately 45° with a central axis of an exit barrel 144. Unlike the exit barrels of FIGS. 2, 3, 6A and 6B, the exit barrel 144 is of generally cylindrical configuration. As in the example of FIG. 6A, the cathode 136 is positioned relative to the arc chamber 138 and the passage 140 so as to produce an arc 146 extending to an anode attachment 148 on the wall of the anode 134.

In the embodiment of FIG. 7, powder is delivered along an axis which coincides with a central axis of the exit barrel 144. In this respect, the plasma gun 130 of FIG. 7 is similar to the plasma guns shown in FIGS. 2 and 6A. However, the point of introduction of the powder is past the bend 142 and is actually within the exit barrel 144. This is provided by a powder injector 150 in the form of a hollow tube having a central powder delivery passage 152 therein. Because the powder injector 150 resides within a very hot region inside the plasma gun 130, it must be capable of withstanding the high temperatures present. For relatively low temperature applications, it may suffice to make the powder injector 150 of temperature resistant materials such as tungsten. However, for many applications, the powder injector 150 should be water-cooled for best results. An example of a water-cooled version of the powder injector 150 is shown in the sectional view of FIG. 8.

Figure 8:
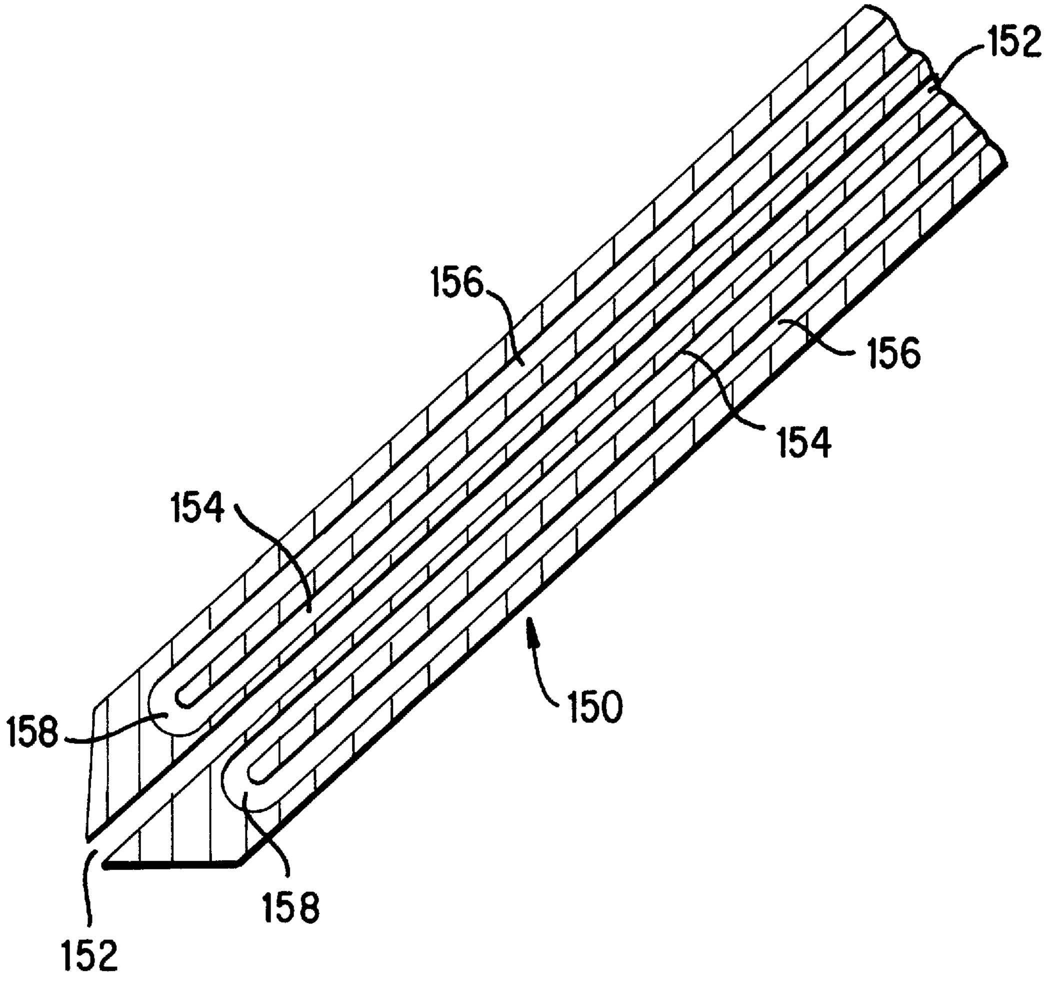
FIG. 8 is a sectional view of a water-cooled plasma injector which may be used in the embodiment of FIG. 7.

As shown in FIG. 8, the powder injector 150 is of generally cylindrical configuration and has the central powder delivery passage 152 therein. Outside of the powder delivery passage 152, the powder injector 150 is provided with an inner passage 154 and an outer passage 156. The inner and outer passages 154 and 156 are of generally cylindrical configuration, are concentrically disposed, and are joined by a connecting passage 158 in a region adjacent the tip of the powder injector 150. The inner passage 154 is coupled to a source of cooling water or other cooling fluid (not shown), which may be of conventional design. The cooling water flows through the inner passage 154 to the region of the tip of the powder injector 150, then through the connecting passage 158 to the outer passage 156. Within the outer passage 156, the cooling water is returned to the source thereof. The presence of the cooling water or other cooling fluid within the inner and outer passages 154 and 156 enables the powder injector 150 to withstand very high temperatures at the inside of the plasma gun 130.

By placing the powder injector 150 within the entry end of the exit barrel 144 and along the central axis of the exit barrel, powder is introduced at a central location within the plasma stream and in a direction so that it simply continues to flow along the central axis of the exit barrel 144. Unlike the prior examples where the powder is introduced at the wall of the passage, where it is subject to being deflected by the passing plasma stream, the embodiment of FIG. 7 enables the powder to be introduced within the plasma stream and in the same direction as the plasma stream. By introducing the powder along the central axis of the exit barrel 144, there is virtually no diversion of the powder stream by the plasma stream, or vice versa, and the powder flows along the central axis of the exit barrel 144 with the plasma stream.

While the powder injector 150 is shown extending along the central axis of the exit barrel 144 in the plasma gun 130 of FIG. 7, so that the powder stream is introduced in the same direction as that of the passing plasma, it should be understood that there may be instances in which it is desired to angle the powder injector relative to the central axis of the exit barrel. While axial injection of the powder is normally preferred, it should be understood that the powder injector can be angled somewhat where the situation so dictates, such as where a slight deflection of the plasma stream may be desired.

While various forms and modifications have been suggested, it will be appreciated that the invention is not limited thereto but encompasses all expedients and variations falling within the scope of the appended claims.

What is claimed is:

1. A single cathode plasma gun in which injected powder exits generally along a central axis of an exit barrel of the gun, comprising the combination of:

an exit barrel having a central axis extending along a length thereof;

an anode having a central axis;

a single cathode centrally disposed within the anode and having a central axis which generally coincides with the central axis of the anode, the central axis of the anode extending through a plasma arc passage adjacent the single cathode and intersecting the central axis of the exit barrel at a first angle greater than 0° but substantially less than 90° at a location adjacent where the plasma arc passage couples to the exit barrel; and a powder feed passage which extends to a region adjacent the location where the plasma arc passage couples to the exit barrel and has a central axis intersecting the central axis of the single cathode at a second angle at least as large as the first angle, the powder feed passage terminating substantially at the central axis of the exit barrel and introducing a stream of powder substantially along the central axis of the exit barrel and in a manner so that the stream of powder is concentrated at the central axis of the exit barrel along at least a substantial portion of the length of the exit barrel;

the single cathode being positioned at a location along the central axis of the anode and the plasma gun being operated to produce a charged plasma which extends to at least the powder feed passage so that the stream of powder is concentrated at the central axis of the exit barrel through the charged plasma and at least a substantial portion of the stream of powder flows through the charged plasma.

2. A single cathode plasma gun in which injected powder exits generally along a central axis of an exit barrel of the gun, comprising the combination of:

an exit barrel having a central axis extending along a length thereof;

an anode;

a single cathode centrally disposed within the anode and having a central axis intersecting the central axis of the exit barrel at an acute angle of substantially less than 90°; and a powder feed passage having a central axis generally coinciding with the central axis of the exit barrel so as to introduce a stream of powder along the central axis of the exit barrel and in a manner so that the stream of powder is concentrated at the central axis of the exit barrel along at least a substantial portion of the length of the exit barrel, the single cathode being spaced-apart from the exit barrel and being positioned at a location within the anode and the plasma gun being operated to produce a charged plasma which extends to at least the powder feed passage so that the stream of powder is concentrated at the central axis of the exit barrel through the charged plasma and at least a substantial portion of the stream of powder flows through the charged plasma.

3. A plasma gun in accordance with claim 2, wherein the acute angle is approximately 45°.

4. A plasma gun in accordance with claim 2, wherein the acute angle is approximately 10°.

5. A single cathode plasma gun in which injected powder exits generally along a central axis of an exit barrel of a gun, comprising the combination of:

an anode having a central axis;

a single cathode centrally disposed within the anode and having a central axis which generally coincides with the central axis of the anode;

a passage extending from the single cathode along the central axis of the anode to a bend, then from the bend along a central axis of and terminating in an exit barrel, the central axis of the exit barrel extending along a length thereof, the central axis of the anode intersecting with the central axis of the exit barrel at the bend and forming an acute angle of substantially less than 90° therewith; and a powder feed passage having a central axis generally coincident with the central axis of the exit barrel and terminating at a region adjacent the bend in the chamber so as to introduce a stream of powder generally along the central axis of the exit barrel and in a manner so that the stream of powder is concentrated at the central axis of the exit barrel along at least a substantial portion of the length of the exit barrel, the single cathode being spaced-apart from the bend and being positioned at a location within the anode and the plasma gun being operated to produce a charged plasma which extends to at least the central axis of the powder feed passage so that the stream of powder is concentrated at the central axis of the exit barrel through the charged plasma and at least a substantial portion of the stream of powder flows through the charged plasma.

6. A single cathode plasma gun in accordance with claim 5, wherein the exit barrel diverges from an entrance to an exit and the bend is located adjacent the entrance of the exit barrel.

7. A plasma gun for producing a charged plasma at a point of powder introduction, comprising the combination of:

an anode having a central axis;

a single cathode having a central axis and disposed within a plasma arc passage in the anode so that the central axis thereof is generally coincident with the central axis of the anode, the plasma arc passage extending from the cathode to a bend therein in which the passage forms an acute angle of greater than 0° but substantially less than 90° as it exits the plasma gun through an exit barrel; and a powder feed passage terminating at a point of powder introduction within the passage and adjacent the bend so as to introduce a stream of powder generally along a central axis which extends along the length of the exit barrel and in a manner so that the stream of powder is concentrated at the central axis of the exit barrel along at least a substantial portion of the length of the exit barrel;

the cathode being positioned within the plasma arc passage and the plasma gun being operated to produce a charged plasma which extends to at least the point of powder introduction so that the stream of powder is concentrated at the central axis of the exit barrel through the charged plasma and at least a substantial portion of the stream of powder flows through the charged plasma.

8. A plasma gun in accordance with claim 7, wherein the cathode has a plasma arc extending therefrom which terminates at an anode attachment on a wall of the passage on the other side of the bend from the cathode.

9. A plasma gun in accordance with claim 7, wherein the cathode is axially adjustable along the plasma arc passage to optimize injection of powder from the powder feed passage into a portion of the charged plasma of desired temperature.

10. A plasma gun in accordance with claim 7, wherein the passage forms an angle of approximately 45° at the bend, the exit barrel has a central axis, and the powder feed passage has a central axis generally coincident with the central axis of the exit barrel.

11. A single cathode plasma gun in which injected powder is introduced within an exit barrel at a central axis of the exit barrel and exits the exit barrel generally along the central axis thereof, comprising the combination of:

an exit barrel having a central axis;

an anode;

a single cathode centrally disposed within the anode and having a central axis which extends through a plasma arc passage adjacent the single cathode and intersects the central axis of the exit barrel at a first angle greater than 0° but substantially less than 90°; and a powder injector extending into the plasma arc passage from a wall of the plasma arc passage and terminating at a location within the exit barrel and at the central axis of the exit barrel;

the powder injector comprising an elongated member having a central powder feed passage therein, and at least one cooling fluid passage therein between the central powder feed passage and an outer surface of the powder injector.

12. A single cathode plasma gun in accordance with claim 11, wherein the at least one cooling fluid passage comprises a pair of concentrically disposed cylindrical passages joined by a connecting passage adjacent an outer tip of the powder injector.

* * * * *